Poppenhusen & Simon,
Table Knife.
N° 16,955.   Patented Mar. 31, 1857.

Witnesses:
W<sup>m</sup> H. Bishop
Joel B. Wilson

Inventors
C. Poppenhusen
C. F. E. Simon

UNITED STATES PATENT OFFICE.

CONRAD POPPENHUSEN AND C. F. E. SIMON, OF COLLEGE POINT, NEW YORK, ASSIGNORS TO CONRAD POPPENHUSEN.

MAKING TABLE-KNIVES.

Specification of Letters Patent No. 16,955, dated March 31, 1857.

*To all whom it may concern:*

Be it known that we, CONRAD POPPENHUSEN and C. F. EDWARD SIMON, of College Point, Queens county, and State of New York, have invented a new and useful Improvement in the Manufacture of Table-Knives; and we do hereby declare that the following is a full, clear, and exact description thereof, reference being had to the accompanying drawings, making part of this specification, in which—

Figure 4:
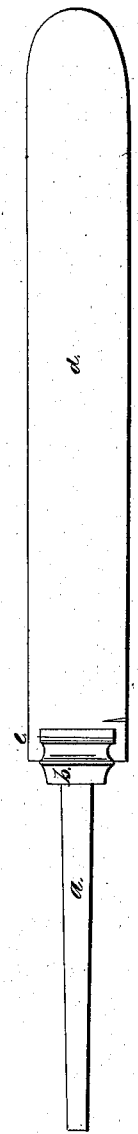
Figure 1:
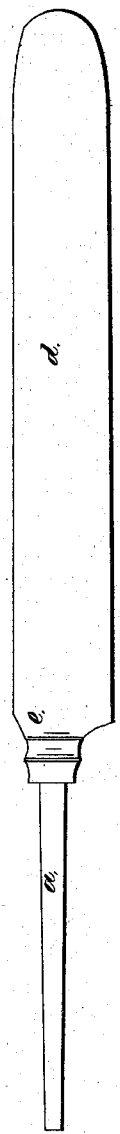
Figure 2:
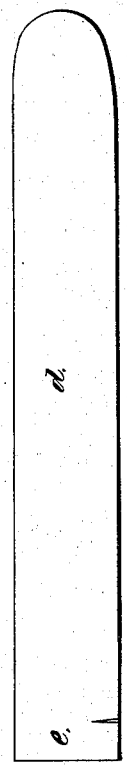
Figure 3:
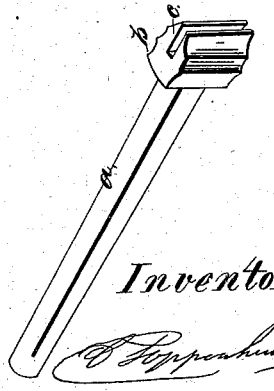

Figure 1 represents the knife complete but without the handle; Fig. 2 the plate of steel for the blade prepared for, but before it is attached to the shank; Fig. 3 a separate view of the shank prepared for being attached to the blade; and Fig. 4 a representation of the blade and shank put together before welding.

The same letters indicate like parts in all the figures.

In manufacturing table knives it has been the practice heretofore to make the shank of what is known as malleable cast iron, with a flat piece extending forward of the balance nut which is then secured to the steel blade by the usual flat weld. But this mode of manufacturing is defective for the reason that the lap of malleable iron extends onto the blade and is there visible particularly after the knife has been in use, and for the further reason that this mode of effecting the union requires the blade to be made of greater thickness where the weld is made than is required for the purposes of the blade.

To avoid these and other difficulties our invention in the manufacture of table knives consists in uniting the steel blade with the cast shank whether of cast iron or what is known as malleable iron by cutting a groove in the forward part of the balance nut of the shank of the required size to receive the rear end of the steel blade which is ground, filed or otherwise reduced to the required thickness for insertion in the groove of the balance nut while the latter is heated to the temperature of about a cherry red, with borax applied to the surfaces which are to be united after such surfaces have been well cleansed, and then heating the nut with the steel blade inserted to about a cherry red heat, and then effecting the weld of the surfaces by the application of percussive pressure on the outer surfaces of the nut.

In the accompanying drawings (*a*) represents the shank made of cast or malleable iron, or it may be simply of cast iron although we prefer malleable iron. It is cast with a balance nut (*b*) of any desired pattern, and the form of the shank is to be of any size suited to the handle. In the forward end of the nut we cut a groove (*c*) in the plane of the blade and to the depth of about one half the length of the nut, more or less, and with the sides thereof parallel in all directions. The blade (*d*) we make of steel cut out of sheets or strips of the required thickness, and the rear part (*e*) thereof we grind, file, or plane to the required thickness to fit the groove in the balance nut freely when the nut is heated.

The parts being prepared as above, and the inner surfaces of the groove (*c*) and of the parts of the blade to fit therein being bright and clean, we heat the nut to about a cherry red temperature, and, after applying borax to the surfaces, the part (*e*) of the blade is inserted in the groove (*c*) and then heat is again applied until the nut and the part of the blade inserted therein are brought up to about a cherry red heat, and then it is hammered or swaged by which a weld is effected. After this the knife is to be finished in the usual way. In this way we are enabled to make the blades of sheet steel rolled to the required thickness with the shank of malleable or cast iron with a strong and permanent union of the two without extending the malleable or cast iron beyond the balance nut, thus avoiding all the defects presented by the mode of manufacture heretofore practiced.

We are aware that German silver knives have been made by fitting the rear end of the German silver blade to a V shaped groove in the forward end of the German silver balance nut and then uniting them by solder, and we do not wish to be understood as claiming broadly the union of the blade with the balance nut by either welding or soldering; but What we do claim as our invention and desire to secure by Letters Patent is—

The mode of procedure herein described by which we effect the union of the steel blade with the cast balance nut, whether of malleable or ordinary cast iron, by preparing the rear end of the steel blade with cleansed parallel sides fitting a groove with parallel sides in the cast balance nut, preparing the surfaces with borax or other equivalent flux, and then welding the same by heat and pressure, as herein described and for the purpose set forth.

C. POPPENHUSEN.
C. F. E. SIMON.

Witnesses.
WM. H. BISHOP,
JOEL B. WILSON.